Patented Jan. 5, 1937

2,066,707

UNITED STATES PATENT OFFICE 2,066,707

ACID WOOL DYESTUFFS OF THE ANTHRAQUINONE SERIES

Klaus Weinand, Leverkusen-I. G. Werk, Germany, assignor to General Aniline Works, Inc., New York, N. Y., a corporation of Delaware No Drawing. Application August 30, 1935, Serial No. 38,660. In Germany September 14, 1934

4 Claims. (Cl. 260—60)

The present invention relates to new acid wool dyestuffs of the anthraquinone series.

The object of my present invention is to prepare new and wool dyestuffs of the anthraquinone series which are characterized by an extremely good fastness to chlorine and to agents being capable of splitting off chlorine such as chlorinated lime.

With this object in view my invention consists in the preparation of dyestuffs of the following formula:

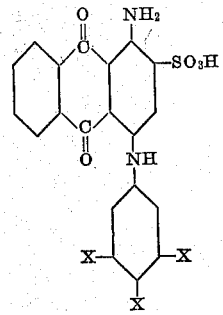

wherein X represents chlorine or bromine. These dyestuffs represent blue needles which are dissolved in water with a blue coloration and dye wool from an acid bath fast blue shades. As pointed out above the new dyestuffs are very fast to chlorine. The dyestuffs can be prepared in the usual manner by causing 3,4,5-trihalogenanilines to react upon 1-amino-4-halogenanthraquinone-2-sulfonic acids. The reaction is preferably performed in the presence of copper salts as catalysts.

The following example illustrates the invention without restricting it thereto:—

Example 10 parts by weight of 1-amino-4-bromoanthraquinone-2-sulfonic acid are boiled for 8–10 hours while refluxing with 8 parts by weight of 3,4,5-trichloraniline, 10 parts by weight of sodium bicarbonate and 0.5 part of cuprous chloride in a mixture of 100 parts by weight of water and 50 parts by weight of ethyl alcohol. After cooling the separated dyestuff is sucked off. For being purified it is dissolved in water and salted out by the addition of common salt. It represents blue needles which dissolve in water with a blue coloration and dye wool from an acid bath extremely fast blue shades.

Dyestuffs of similar properties are obtained when replacing the 3,4,5-trichloraniline by the 3,4,5-tribromoaniline or by the 3,5-dichloro-4-bromo-aniline.

I claim:—

1. The product of the following formula:

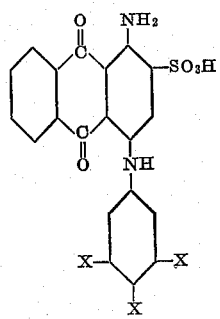

wherein X stands for a halogen selected from the group consisting of chlorine and bromine, these products dyeing wool from an acid bath blue shades of excellent fastness to chlorine.

2. The product of the following formula:

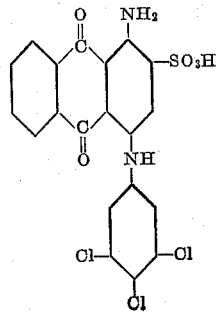

this product dyeing wool from an acid bath blue shades of excellent fastness to chlorine.
3. The product of the following formula:
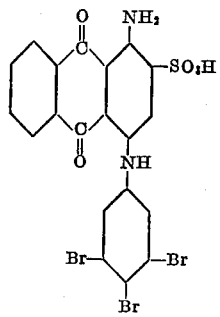
this product dyeing wool from an acid bath blue shades of excellent fastness to chlorine.
4. The product of the following formula:
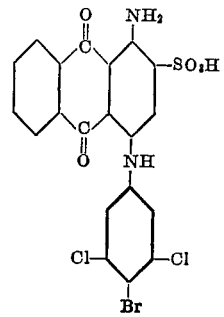
this product dyeing wool from an acid bath blue shades of excellent fastness to chlorine.
KLAUS WEINAND.